Figure 1:
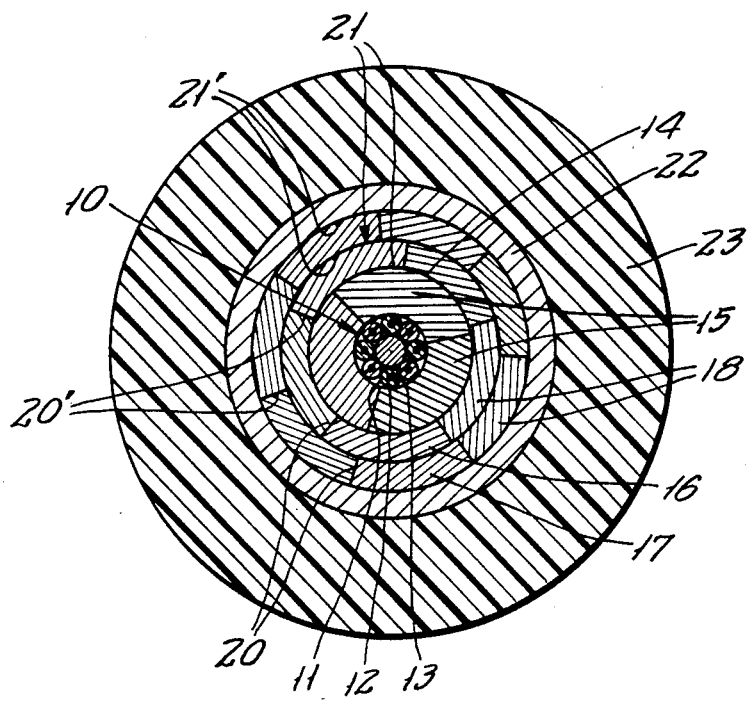

United States Patent [19]

Occhini et al.

[11] Patent Number: 4,690,497
[45] Date of Patent: Sep. 1, 1987

[54] UNDERWATER OPTICAL FIBER CABLE WITH SEGMENTED PROTECTIVE TUBE

[75] Inventors: Elio Occhini; Giuseppe Bianchi, both of Milan, Italy

[73] Assignee: Societa Cavi Pirelli, S.p.A., Milan, Italy

[21] Appl. No.: 738,059

[22] Filed: May 24, 1985

[30] Foreign Application Priority Data

May 29, 1984 [IT] Italy ................... 21158 A/84

[51] Int. Cl.⁴ ............................................. G02B 6/44
[52] U.S. Cl. ............................................... 350/96.23
[58] Field of Search ................................. 350/96.23

[56] References Cited

U.S. PATENT DOCUMENTS 4,341,440  7/1982  Trezeguet et al. ............ 350/96.23
4,416,508  11/1983  Dey et al. ..................... 350/96.23

FOREIGN PATENT DOCUMENTS 3118172  11/1982  Fed. Rep. of Germany ... 350/96.23
56-164308  12/1981  Japan .......................... 350/96.23
2017968  10/1979  United Kingdom ......... 350/96.23
2029048  3/1980  United Kingdom ......... 350/96.23

Primary Examiner—John Lee
Attorney, Agent, or Firm—Brooks, Haidt, Haffner & DeLahunty

[57] ABSTRACT

An underwater optical fiber cable for laying at great depths in which an optical fiber core containing a plurality of optical fibers is protected by a peripherally segmented metal tube, each metal segment, in cross-section, having the shape of a sector of an annular, which is surrounded by at least one layer of elongated metal elements wound helicoidally around the tube, each element having radially extending sides which have radial lengths less than the peripheral lengths of the peripheral surfaces of the element. The layer or layers are surrounded by a watertight, conductive metal sheath and preferably, the sheath is surrounded by a plastic sheath.

14 Claims, 2 Drawing Figures

UNDERWATER OPTICAL FIBER CABLE WITH SEGMENTED PROTECTIVE TUBE

The present invention relates to an improved optical fiber submarine cable, and particularly to a submarine cable for sea floors.

By "a submarine cable for sea floors" is meant a cable that is specially, but not exclusively, adapted for laying at very deep sea floor levels, i.e. at a depth of about 8000 meters and over. As is known by those skilled in the art, a cable of this type has to be able to tolerate the various strains occurring both during the cable laying operation as well as during the cable operation.

During the laying operations, the forces which are particularly critical are the variable traction forces along the cable which diminish with the depth and to which the cable must be subjected, and the variable radial pressure of the surrounding water which tends to squeeze the cable.

On the layed cable, the main applied force is the hydrostatic pressure which is due exclusively to the pressure of the surrounding water which tends to press down upon the cable.

In the field, there have already been realized structures which, while attempting to totally release the optical fibers from the traction strains, attempt at the same time to give to the assembly a stable configuration even int he presence of considerable hydrostatic forces which are due to the depth of the layed cable.

One prior art method suggests, for example, a watertight, central tubular member disposed around the optical core. By "optical core" is meant the assembly of the optical fibers and any of their supports or cladding, taping, etc. Generally speaking, the tubular element is made of a metal which is easy to work, for example, aluminum, copper, or alloys of such metals.

The tubular member can be formed by extrusion, but even better, by having an aluminum tube made with a longitudinal tape that is folded and welded at its edges. Both of these techniques, of extruding and of welding, require the application of heat. Hence, it is necessary to protect the underlying optical core thermally with protective layers. However, this unduly thickens the cable itself and thereby renders it hardly manageable as well as cumbersome.

Therefore, it was considered preferable to create, over the optical core, a tubular member which did not require any use of heat. One solution is represented by the use of a helicoidally wound assembly of elongated elements. These elongated elements have a transverse cross-section approximating the sector of an annulus for offering a good resistance against radial pressure. Around this tubular member, there are disposed the traction resistant elements consisting of one or more layers of steel wires having a circular section and would helicoidally.

The steel wires have, by their very nature, a greater hardness than that of the metal constituting the underlying elongaated elements which have a cross-section aproximating a sector of an annulus, and when the steel wires are subjected to strong traction forces, they tend to spread and to deform the elongated element along their contacting lines, thereby causing permanent cuts. These cuts, as it is quite evident, weaken the structure of the tubular member which is prevented from reacting elastically to the applied stresses. Hence, there results a lengthing of the cable which is able to prove critical for the optical fibers.

Moreover, the wires with a circular section, form numerous void spaces between the various layers, and such void spaces contribute to the deformability of the structure under radial pressure. The presence of such void spaces also contributes to further thickening the cable with the negative consequence of making it barely manageable, as explained hereinbefore.

An object of the present invention is to provide an improved submarine cable having an optical core which eliminates the above-mentioned drawbacks while permitting its structure to remain undeformed and to continue acting as an elastic body and at the same time, for equal strength in the traction resistant section, a lesser encumbrance that that which is found in known cables.

More particularly, the principal object of the present invention is an improved submarine, optical cable for telecommunications, especially but not exclusively intended for being layed on sea floors at a deep water level, and which has at least one cnetral tubular member around the opticl core which is constituted by elongated metallic elements, each elongated element having a transverse cross-section approximating a sector of an annulus. The tubular member is surrounded by elongated, mechanically resistant, metallic elements which are helicoidlly would to form at least one layer, and this layer is surrounded by at least one watertight conductive sheath and by at least one insulating sheath. The cable is characterized by the fact that said elongated, mechanically resistant elements surrounding the tubular member, have quadrangular transverse cross-sections, with one pair of opposite sides, which are directed radially to the cable axis, being smaller than the other two opposite sides.

In a preferred embodiment, the ratio between each one of the sides which are directed radially to the cable, to the remaining sides of the mechanically resistant elements, is in the range from 1:3 and 1:8.

Figure 2:
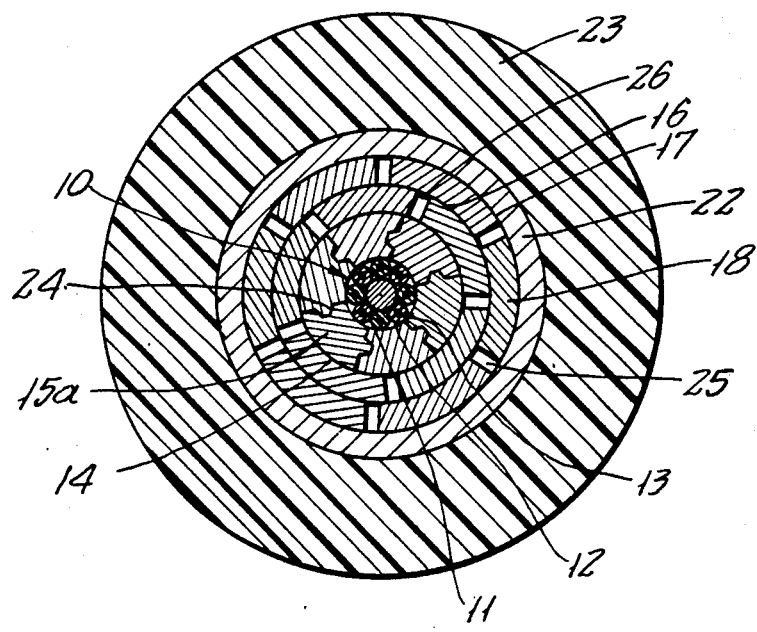

Other objects and advantages of the present invention will be apparent from the following detailed description of the presently preferred embodiments thereof, which description should be considered in conjunction with the accompanying drawings in which:

FIG. 1 is a transverse cross-section of one preferred embodiment of an optical fiber cable used for telecommunications, according to the invention; and FIG. 2 is a transverse cross-section, of another preferred embodiment of an optical fiber cable used for telecommunications, according to the invention.

In FIG. 1 there is illustrated the transverse cross-section of a submarine cable with optical fibers adapted to be layed on deep sea floors.

The underwater or submarine cable comprises an optical core 10, comprising a plurality of optical fibers 11 having an adherent thermoplastic covering 12. The opticl fibers are wound around a wire 13 which is preferably, but not necessarily metallic, and which has the purpose of functioning as a traction resisting member.

The optical core 10 is contained inside a central tubular member 14, constituted by a layer of elongated, metallic elements 15 having transverse cross-sections which have substantially the shape of a sector of an annulus. Hereinafter such elements 15 will be referred to simply as "segmental wires" 15. The segmental wires 15 are preferably made from a metallic material which is easily worked, such as, for example, aluminum and its alloys or copper and its alloys.

In FIG. 1, just three segmental wires are illustrated. It has been found, nevertheless, that the number of said segmental wires 15, which are suited for constituting a tubular structure which presents an optimum resistance against the hydrostatic radial pressure, is comprised between three and five. In fact, it has been observed that a lesser or greater number of segmental wires can produce undesirable slippage of the elongated metallic elements 15 under the action of radial forces.

Two layers 16 and 17, of helicoidally wound, traction resistant or mechanically resistant, elongated elements 18, surround the central tubular member 14.

The mechanically resistant elongated elements 18 have a quadrangular shaped, transverse cross-section, with the pair of opposite sides 20,20', which are directed radially to the cable axis, being smaller than the other pair of sides 21,21'.

Each one of the sides 20 or 20', directed radially to the cable axis has, preferably, a ratio in the range from 1:3 to 1:8 with respect to the other two sides 21 and 21' of the same transverse cross-section.

For simplicity sake, the resistant elements 18 will, hereinafter in this text, be referred to as "metal straps".

Preferably, the metal straps 18 will be shaped in such a way as to better fit with the cylindrical form of the underlying central tubular member 14. A preferred shape of the metal straps 18 is one which mate witht he segmental wires. The metal straps 18, of the same layer, are wound helicoidally in such a way that the adjacent metal straps lie next to one another. This allows for the reciprocal cooperation of the metal straps with each other for opposing the radial thrust caused by both the hydrostatic pressure as well as by any pull on the cable which may be exercised during the laying operation.

The outer layer 17 of metal straps is surrounded by a watertight sheath 22. This latter preferably is made out of a material having a good electrical conductivity for permitting the supply of direct current through it for energizing any underwater transmitters or repeaters. Among the materials endowed with a good electrical conductivity, aluminum and its alloys are preferred because of their light weight. The conductive sheath 22 can be provided by means of extrusion, or else, as an alternative, by longitudinally folding a tape around the layer and welding its edges together.

The watertight conductive sheath 22 is covered with at least one sheath 23 which is made, for example, of an extruded thermoplastic material such as polyethylene, polypropylene, or some other material which carries out the same function.

In FIG. 2 there is shown an alternative embodiment of the cable wherein, around an optical core 10 (constructed as in FIG. 1), there is disposed a central tubular member 14 comprising a number of segmental wires 15a which is greater than the preferred number of from three to five. More precisely, the segmental wires shown in FIG. 2, by way of example, are six in number.

To ensure the indeformability of the central tubular member 14 when subjected to radial thrusts which stress the segmental wires 15a, the segmental wires 15a are provided with connecting and anti-sliding means 24 which interlock the adjacent segmental wires. These connecting means could be, for example, formed by the projection 24 present on one flank of each segmental wire which mates with an appropriate slot or groove present on the flank, next to it, of the adjacent segmental wire 15a.

The metal straps 18 of the layers 16 and 17 of the resistant elements, are helicoidally would in such a way that the circumferentially adjacent elements 18 are spaced apart from each other as shown in FIG. 2.

The spacing 25 between a metal strap 18 and the metal strap adjacent to it, allows for an easier handling of the cable while still allowing for a safe laying of the cable at considerable depths. Preferably, the spacing 25, between two resistant elements 18 of a layer 17 is offset with respect to the spacing 26 between the two corresponding adjacent elements of the layer 16, either above or below.

The width of the metal straps 18 allows a distribution of the forces acting on them, both the forces of traction during their stretching and the forces acting radially due to the hydrostatic pressure, along underlying surfaces which are extended sufficiently enough for providing a reliable elastic response of the cable structure.

Preferably, the interstices existing between the segmental wires 15 or 15a of the central tubular member 14, in the cavity within the tubular member 14 for housing the optical core 10, and between the resistant elements 18 and both above and below the same, are filled with a water blocking filler. This has the purpose of preventing any longitudinal migration of water which might penetrate due to any eventual leakage in the watertight conductor sheath 22 itself.

Such filler could be of the grease type, for example, a silicone grease, but it can also be a material which tends to swell in the presence of water and which is capable, in this manner, of creating a barrier against the water progression.

In a further preferred embodiment, the filler could also be a substance which, in itself, combines filling and lubricating properties such as an organic oil which permits improvement of the sliding when any relative pulling occurs between the metal straps 18 themselves, or with respect to the segmental wires 15, thereby contributing not negligibly to improving the flexibility of the cable.

In both figures of the drawings, there are shown improved submarine cables according to the invention wherein, for simplicity sake, the optical core 10 has been indicated as consisting of a metallic rod 13 which is surrounded by a plurality of optical fibers 11, each optical fiber 11 being enclosed in an adherent sheath 12. It must nevertheless be understood that the optical core 10 can be constructed in any other satisfactory way. For example, the core 10 could comprise optical fibers which are loosely enclosed in a plastic sheath, with or without fillers. Also, the core 10 could comprise a helicoidally grooved, tension resistant element, the grooves of which receive optical fibers which are bare, or else enclosed, loosely or tightly, in a sheath.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An underwater, optical fiber cable comprising an optical fiber core including one or more optical fibers, a pressure resisting tube surrounding said core, said tube being formed by a plurality of elongate wires of copper or aluminum and their alloys, each elongate wire having, in transverse section, substantially the shape of a sector of an annulus, a layer of helicoidally wound, elongate steel elements surrounding said tube and a tubular, water-tight conductive sheath surrounding said layer of said elements, wherein the improvement comprises providing said elements in the form of side-by-side elongate elements each of which has a quadrangular, transverse cross-section with the radial lengths of the radially extending sides thereof smaller than the peripheral lengths of the peripherally extending sides thereof.

2. A cable as set forth in claim 1 further comprising a sheath of insulating material around said water-tight, conductive sheath.

3. A cable as set forth in claim 1 wherein the ratio of said radial lengths to said peripheral lengths is in the range from 1:3 to 1:8.

4. A cable as set forth in claim 1, 2 or 3 wherein said layer of helicoidally wound, elongate steel elements has an inner surface which conforms to the outer surface of said tube.

5. A cable as set forth in claim 1 wherein each said element has, in transverse cross-section, the shape of a sector of an annulus.

6. A cable as set forth in claim 1 wherein the radially extending sides of each said element abut the radially extending sides of adjacent elements.

7. A cable as set forth in claim 1 wherein the radially extending sides of each said element are spaced from the radially extending sides of adjacent elements.

8. A cable as set forth in claim 1 wherein there are a plurality of layers of helicoidally wound, elongate metal elements, wherein the radially extending sides of each element in each layer are spaced from the radially extending sides of adjacent elements in the same layer and wherein the spaces between elements of one layer are peripherally offset with respect to the spaces between elements of the next adjacent layer.

9. A cable as set forth in claim 1, 7 or 8 further comprising a water blocking filler within said conductive sheath.

10. a cable as set forth in claim 9 wherein said filler is a lubricant selected from the group consisting of silicone grease, organic oils and mixtures thereof.

11. A cable as set forth in claim 9 wherein said filler is a material which swells in the presence of water.

12. A cable as set forth in claim 1 wherein the number of said elongate wires is in the range from three to five.

13. A cable as set forth in claim 1 wherein said elongate wires have interconnecting means at the radial sides thereof which prevent radial displacement of said wires with respect to each other.

14. A cable as set forth in claim 13 wherein said interconnecting means comprises interfitting projections and grooves at the radial sides of said wires, the projection at the radial side of one wire being received in a groove at the radial side of the next adjacent wire.

* * * * *

UNITED STATES PATENT AND TRADEMARK OFFICE
CERTIFICATE OF CORRECTION

PATENT NO.  : 4,690,497
DATED       : September 1, 1987
INVENTOR(S) : Occhini et al It is certified that error appears in the above-identified patent and that said Letters Patent is hereby corrected as shown below:

```
In the Abstract:  line 5, "annular" should read
                        --annulus--;

Col. 1, line 30, "int he" should read --in the--;
Col. 1, line 57, "would" should read --wound--;
Col. 2, line 1, "lengthing" should read --lengthening--;
        line 16, "that" (first occurrence) should
                read --than--;
        line 21, "cnetral" should read --central--;
        line 22, "opticl" should read --optical--;
        line 27, "helicoidlly would" should read
                --helicoidally wound--;
        line 57, "opticl" should read --optical--;
Col. 3, line 27, "witht he" should read --with the--;
Col. 4, line 2, "would" should read --wound--.
```

Signed and Sealed this

Fifteenth Day of March, 1988

Attest:

DONALD J. QUIGG

Attesting Officer

Commissioner of Patents and Trademarks